United States Patent Office 2,695,306
Patented Nov. 23, 1954

2,695,306
PROCESS OF METHYLATING SODIUM ORTHO ARSENITE

George E. Miller, Edgewood Arsenal, and Ebenezer E. Reid, Baltimore, Md.

No Drawing. Application May 6, 1932, Serial No. 609,770

7 Claims. (Cl. 260—442)

(Granted under Title 35, U. S. Code (1952), sec. 266)

This invention described herein may be manufactured and used by or for the Government for government purposes, without payment to us of any royalty thereon.

The invention relates to a process for methylating sodium ortho arsenite and more particularly has reference to the formation of sodium methyl arsonate and its derivatives.

According to a process forming the subject matter of application, Serial No. 590,302, filed February 1, 1932 (Patent No. 2,442,372, issued June 1, 1948) sodium ortho arsenite solution may be methylated by methyl chloride ($CH_3Cl$) so as to form sodium methyl arsonate and its derivatives. To carry out this process, a solution of sodium ortho arsenite in water is formed in accordance with the following equation:

$$As_2O_3 + 6NaOH = 2Na_3AsO_3 + 3H_2O$$

The methylation of the sodium ortho arsenite takes place under pressure and at an elevated temperature in a closed system in which the solution is continuously circulated against a countercurrent of gaseous methyl chloride. During the reaction, in which sodium methyl arsonate is formed, a side reaction takes place which results in the loss of methyl chloride and sodium hydroxide. When the loss of sodium hydroxide has reached a point where its ratio to the arsenious oxide is below that required for the formation of sodium ortho arsenite, methylation is substantially arrested.

The major object of this invention is the provision of a method for increasing the efficiency of processes heretofore used for forming sodium methyl arsonate and its derivatives.

An equally important object of the invention is the association of a method for controlling the concentration of alkali in the reaction at its optimum point in a process for the formation of sodium methyl arsonate and its derivatives which employs methyl chloride as a methylating agent.

Another object of the invention is the association of a method for controlling the concentration of alkali at its optimum point in a continuous process for the formation of sodium methyl arsonate and its derivatives, which is carried out in a closed system and which employs methyl chloride as a methylating agent.

A further object of the invention is the provision of a method for preventing the cessation of methylation of sodium ortho arsenite by methyl chloride due to the occurrence of a side reaction causing the loss of sodium hydroxide.

Still a further object of the invention is the provision of a method for maintaining the ratio of arsenious oxide to sodium hydroxide in a solution of sodium arsenite in such amounts that sodium ortho arsenite is continuously present during its methylation with methyl chloride.

Yet a further object of the invention is the continuous or intermittent addition of sodium hydroxide to a solution of sodium arsenite which is being methylated by methyl chloride.

With these and other objects which may be incident to our improvements, the invention consists in the method to be herein set forth and claimed, with the understanding that the several necessary steps comprising the invention may be accomplished in any order found most suitable for carrying the same into practical effect, without departing from the spirit of the invention and the scope of the appended claims.

As has been previously pointed out, one of the objects of the present invention is to increase the efficiency of a method for forming sodium methyl arsonate and its derivatives, as described in application Serial No. 590,302, filed February 1, 1932 (Patent No. 2,442,372, issued June 1, 1948).

In this application sodium ortho arsenite solution is methylated with methyl chloride to form sodium methyl arsonate. However, sodium ortho arsenite is basic by nature and during the reaction a part of the NaOH from which it is formed, reacts with methyl chloride to form methyl alcohol and sodium chloride. The present invention aims to maintain the ratio of sodium hydroxide to arsenious oxide in the sodium arsenite solution being methylated at such a figure that the sodium arsenite present will not hydrolyze into sodium hydroxide and arsenious oxide, and at the same time keep the alkalinity at a minimum so that the reaction between sodium hydroxide and methyl chloride is kept to the lowest possible rate. This may be accomplished by either continuously or intermittently adding to the sodium arsenite solution, while the process of methylation is proceeding, just a sufficient amount of sodium hydroxide to assure the constant presence of sodium ortho arsenite.

In the process of application Serial No. 590,302 for forming sodium methyl arsonate, sodium ortho arsenite solution is placed within a feed tank and is thence charged into the upper end of a suitable tower from whence it trickles downwardly towards the bottom of the tower and is met by a counter-current of ascending methyl chloride in a gaseous form. The sodium arsenite is continuously circulated, as described above, in a closed system under a pressure of substantially 60 lbs. per square inch at a temperature of substantially 60° C. until approximately 90% of the sodium arsenite solution has been converted to sodium methyl arsonate. This reaction proceeds according to the following equation:

$$CH_3Cl + Na_3AsO_3 = CH_3AsO(ONa)_2 + NaCl$$

It should be noted that with the use of methyl chloride as a methylating agent, a side reaction occurs, with the loss of methyl chloride and sodium hydroxide resulting in the formation of methyl alcohol and sodium chloride, as shown by the equation:

$$CH_3Cl + NaOH = CH_3OH + NaCl$$

When the loss of sodium hydroxide has reached a point where the ratio to arsenious oxide is below that required for the formation of sodium ortho arsenite, methylation is substantially arrested. That is, methylation stops when the ratio of sodium to arsenic falls below 3:1. Obviously this may be overcome by adding alkali in a quantity to maintain the ratio of sodium hydroxide to arsenious oxide equivalent to sodium ortho arsenite, in order that the latter is continuously present. While such practice produces satisfactory results, it should be noted that with an increase in concentration of the free alkali, the hydrolysis of the methyl chloride also increases. This results in a considerable loss of methyl chloride and also contamination of the product.

In the formation of sodium ortho arsenite solution, application Serial No. 590,302 (Patent No. 2,442,372, issued June 1, 1948) discloses one example in which arsenious oxide is used. As previously pointed out, the formation of sodium ortho arsenite proceeds as follows:

$$As_2O_3 + 6NaOH = 2Na_3AsO_3 + 3H_2O$$

The theoretical quantity of 100% sodium hydroxide required for 25 lbs. of 100% arsenious oxide may be found by the ratio given below:

$$197.82 : 240 :: 25 : x$$

The first two figures on the left of the ratio are, of course, the molecular weights of the arsenious oxide and the sodium hydroxide, while $x$ represents the theoretical amount of sodium hydroxide needed to complete the reaction. Upon solving the ratio it will be found that 30.3 lbs. of sodium hydroxide is required. By experimenting, we have determined that the reaction between methyl chloride gas and sodium ortho arsenite solution proceeds most efficiently when there is present this theoretical ratio of sodium hydroxide to arsenious oxide. We propose, therefore, to maintain the concentration of the free alkali at its optimum point and avoid the disadvantages outlined above by adding sodium hydroxide solution to the sodium arsenite in the feed tank employed in methylation. This may be done in any well known manner, as for example, by continuously adding sodium hydroxide or by intermittently adding small quantities of it to the feed tank. In both cases a small amount of the solution within the feed tank may be drawn off and tested in any suitable manner in order to determine if the desired ratio of arsenious oxide to sodium hydroxide is present.

From the foregoing description it will be appreciated that we have devised a novel process for controlling the concentration of free alkali at its optimum point in a process for methylating sodium ortho arsenite solution so as to obtain sodium methyl arsonate. Not only has the efficiency of this process been increased, but it will also be noted that the means for effecting this are simple and require but a small addition of apparatus to that employed in carrying out the methylation of the sodium ortho arsenite.

Although we have described the preferred embodiment of our invention, we wish it to be understood that we do not confine ourselves to the precise details herein set forth by way of illustration, as it is apparent that many changes and variations may be made therein by those skilled in the art, without departing from the spirit of the invention or exceeding the scope of the appended claims.

We claim:

1. In a process for methylating sodium ortho arsenite with methyl chloride, the reaction being carried out in a closed system under pressure and at temperatures above normal, the step of maintaining the ratio of alkali to arsenious oxide equivalent to that stoichiometrically required for formation of sodium ortho arsenite.

2. In a process of methylating sodium ortho arsenite with methyl chloride, the reaction being carried out in a closed system under pressure and at temperatures above normal, the step of maintaining the ratio of alkali to arsenious oxide equivalent to that stoichiometrically required for formation of sodium ortho arsenite by the continuous addition of alkali to the system.

3. In a process of methylating sodium ortho arsenite. with methyl chloride, the reaction being carried out in a closed system under pressure and at temperatures above normal, the step of maintaining the ratio of alkali to arsenious oxide equivalent to that stoichiometrically required for formation of sodium ortho arsenite by the intermittent addition of small quantities of alkali to system.

4. In a process of methylating sodium ortho arsenite, with methyl chloride, the reaction being carried out in a closed system under pressure and at temperatures above normal, the step of maintaining the ratio of sodium hydroxide to arsenious oxide equivalent to that stoichiometrically required for formation of sodium ortho arsenite.

5. In a process of methylating sodium ortho arsenite with methyl chloride, the reaction being carried out in a closed system under pressure and at temperatures above normal, the step of maintaining the ratio of sodium hydroxide to arsenious oxide equivalent to that stoichiometrically required for formation of sodium ortho arsenite by the continuous addition of sodium hydroxide to the sodium arsenite.

6. In a process of methylating sodium ortho arsenite with methyl chloride, the reaction being carried out in a closed system under pressure and at temperatures above normal, the step of maintaining the ratio of sodium hydroxide to arsenious oxide equivalent to that stoichiometrically required for formation of sodium ortho arsenite by the intermittent addition of small quantities of sodium hydroxide to the sodium arsenite.

7. In the process of methylating sodium ortho arsenite with methyl chloride so as to form sodium methyl arsonate, the reaction being carried out in a closed system under pressure and at temperatures above normal, the step of adding sodium hydroxide to the system at such a rate as to maintain in the system a substantially constant ratio of about six mols of sodium hydroxide for each mol of arsenious oxide present, thereby most efficiently compensating for the loss of sodium hydroxide through its reaction with methyl chloride.

References Cited in the file of this patent

UNITED STATES PATENTS

| Number | Name | Date |
| --- | --- | --- |
| 2,442,372 | Miller et al | July 1, 1948 |

FOREIGN PATENTS

| Number | Country | Date |
| --- | --- | --- |
| 14,409 | Great Britain | 1913 |
| 173,796 | Great Britain | Jan. 10, 1922 |

OTHER REFERENCES

"Industrial and Eng. Chem."—vol. 11, pages 826 and 827 (1919).

"Jour. Am. Chem. Soc."—vol. 44, page 805.